(12) United States Patent
Verma et al.

(10) Patent No.: US 11,237,850 B2
(45) Date of Patent: Feb. 1, 2022

(54) METHOD AND ELECTRONIC DEVICE FOR AUTOMATICALLY MANAGING ACTIVITIES OF APPLICATION

(71) Applicant: Samsung Electronics Co., Ltd., Suwon-si (KR)

(72) Inventors: Abhishek Verma, Jankipuram (IN); Avinash Thakur, Rajendra Nagar (IN); Jatin Garg, Karnal (IN); Pranav Jadav, Surendranagar (IN); Shubham Shubham, Badshahpur (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/650,715

(22) PCT Filed: Oct. 5, 2018

(86) PCT No.: PCT/KR2018/011788
§ 371 (c)(1),
(2) Date: Mar. 25, 2020

(87) PCT Pub. No.: WO2019/074244
PCT Pub. Date: Apr. 18, 2019

(65) Prior Publication Data
US 2020/0310839 A1  Oct. 1, 2020

(30) Foreign Application Priority Data
Oct. 9, 2017  (IN) .............................. 201741035820

(51) Int. Cl.
*G06F 9/451*  (2018.01)
*G06F 11/34*  (2006.01)

(52) U.S. Cl.
CPC .......... *G06F 9/451* (2018.02); *G06F 11/3438* (2013.01)

(58) Field of Classification Search
CPC .............................. G06F 1/163; G06F 3/1454
See application file for complete search history.

(56) References Cited

U.S. PATENT DOCUMENTS

| 8,495,484 | B2 | 7/2013 | Ahmed et al. |
| 2012/0096395 | A1 | 4/2012 | Ording et al. |
| 2013/0021270 | A1 | 1/2013 | Lee |

(Continued)

FOREIGN PATENT DOCUMENTS

KR  10-2016-0016545 A  2/2016

*Primary Examiner* — Brian W Wathen
(74) *Attorney, Agent, or Firm* — Jefferson IP Law, LLP

(57) ABSTRACT

Embodiments herein provide method for automatically managing activities of an application in an electronic device. The method includes detecting by an activity controller an input on a data item of the application displayed on a screen of the electronic device. Further, the method includes determining by the activity controller at least one activity associated with the data item.

Furthermore, the method includes causing by the activity controller to automatically display an at least one activity interface and performing the at least one activity associated with the data item within the at least one activity interface. The at least one activity interface comprises a synchronization element to synchronize a result of the at least one performed activity with the application displayed on the screen of the electronic device.

6 Claims, 12 Drawing Sheets

(56) References Cited

U.S. PATENT DOCUMENTS

| | | | |
|---|---|---|---|
| 2014/0089847 A1* | 3/2014 | Seo | G06F 3/04842 |
| | | | 715/800 |
| 2014/0173460 A1 | 6/2014 | Kim | |
| 2015/0009096 A1* | 1/2015 | Lee | G06F 1/163 |
| | | | 345/2.2 |
| 2015/0113471 A1* | 4/2015 | Engstrom | G06F 9/451 |
| | | | 715/781 |
| 2015/0156061 A1* | 6/2015 | Saxena | G06F 17/30864 |
| | | | 715/733 |
| 2015/0302301 A1* | 10/2015 | Petersen | G06Q 10/107 |
| | | | 706/11 |
| 2016/0036751 A1 | 2/2016 | Ban | |
| 2016/0261790 A1 | 9/2016 | Lee et al. | |
| 2017/0060509 A1 | 3/2017 | Tulasi | |
| 2018/0041623 A1* | 2/2018 | Song | H04M 1/72403 |
| 2018/0083913 A1* | 3/2018 | Ganesh | G06F 3/0484 |
| 2018/0101352 A1* | 4/2018 | Choi | G06F 1/163 |
| 2018/0341928 A1* | 11/2018 | Khan | H04L 51/02 |

\* cited by examiner

[Fig. 1]
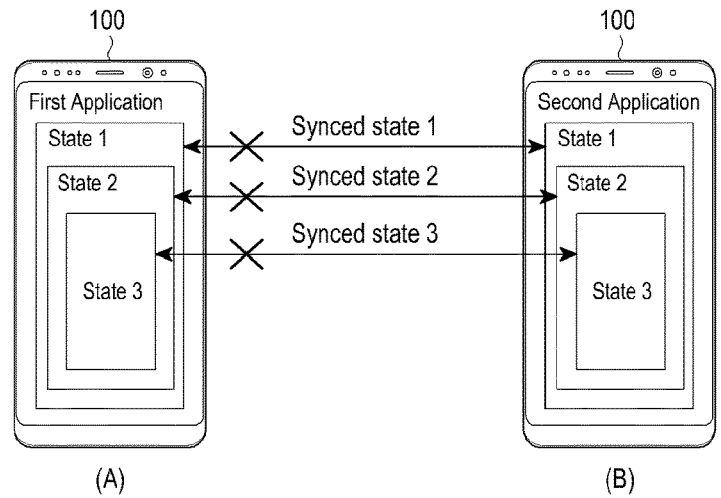
[Fig. 2]
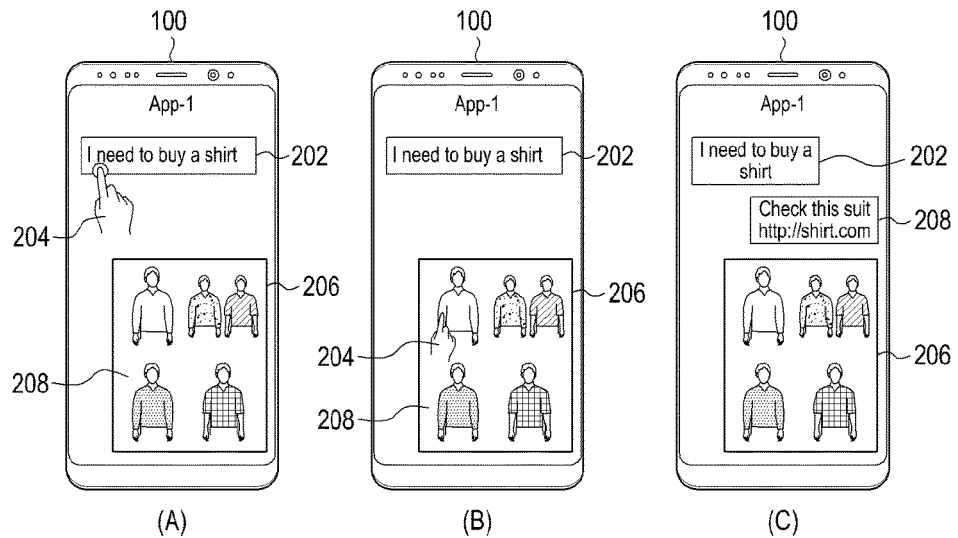
[Fig. 3]
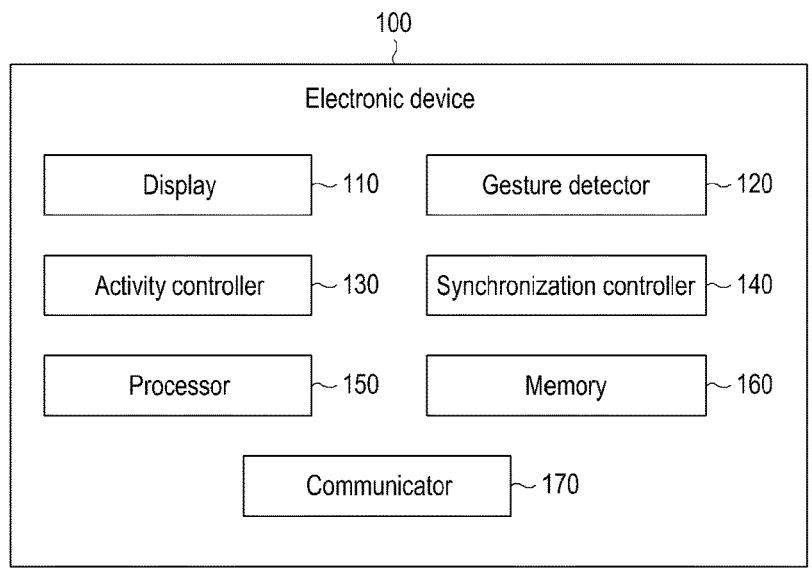

[Fig. 4]
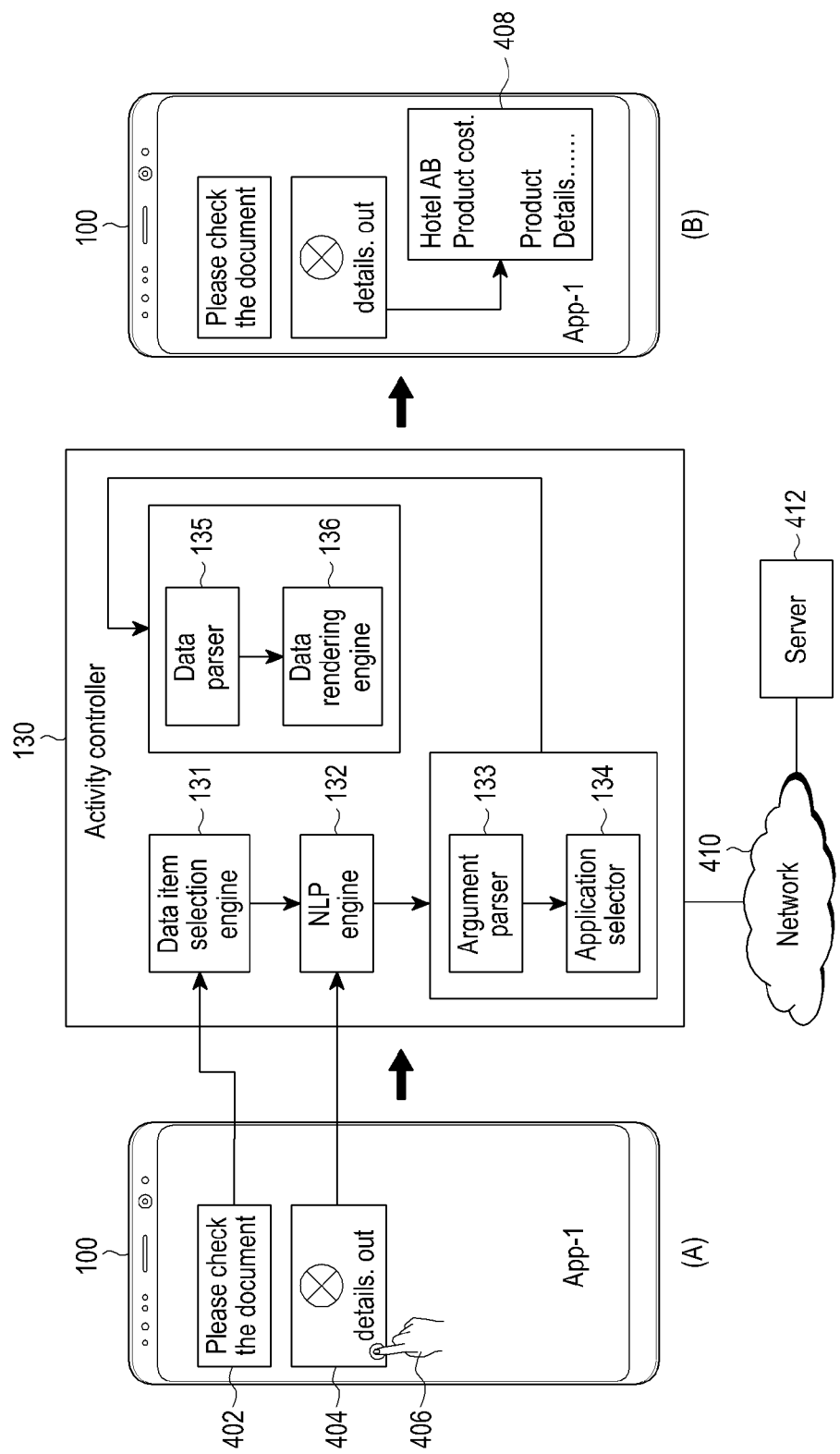

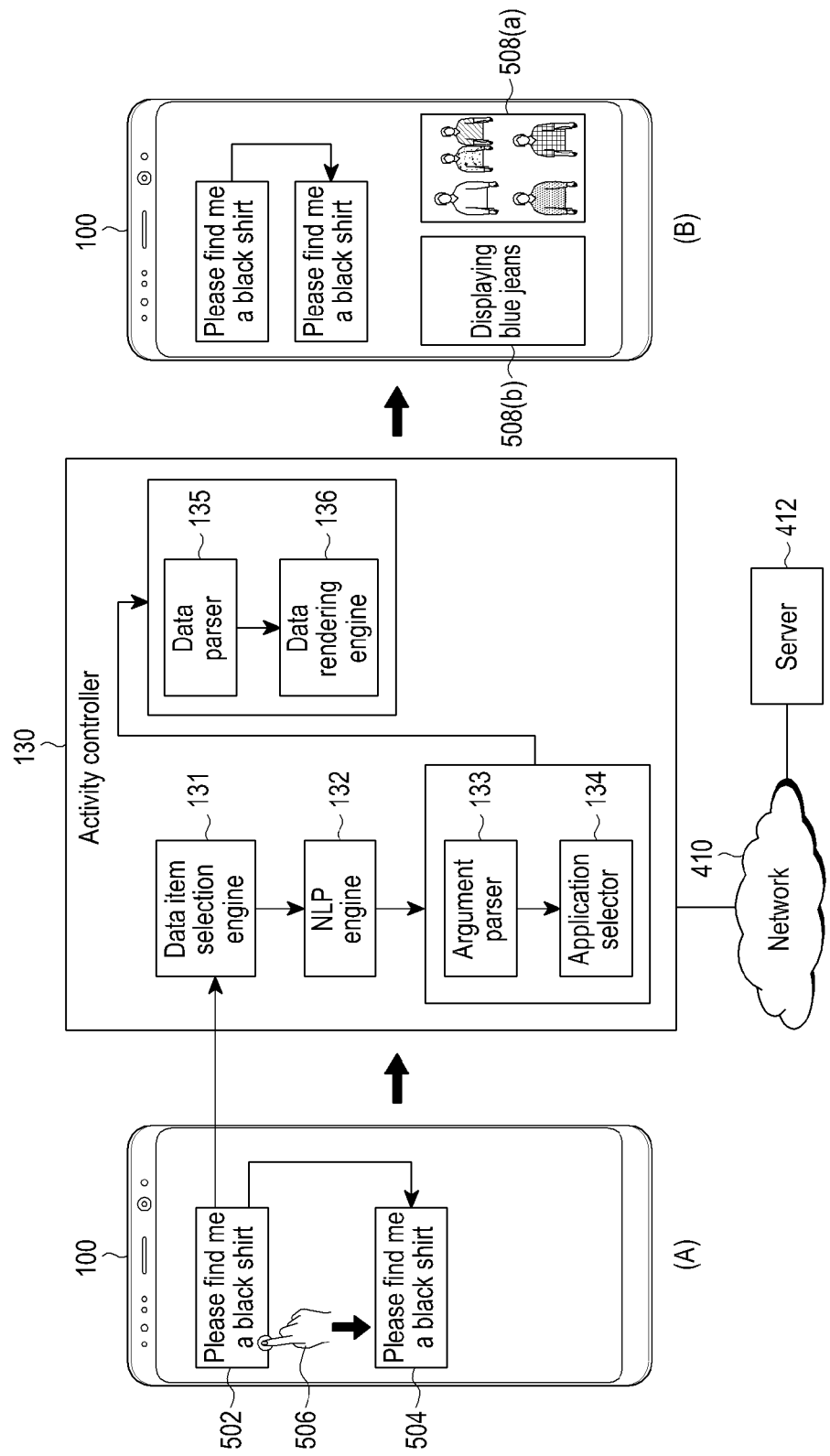
[Fig. 5]

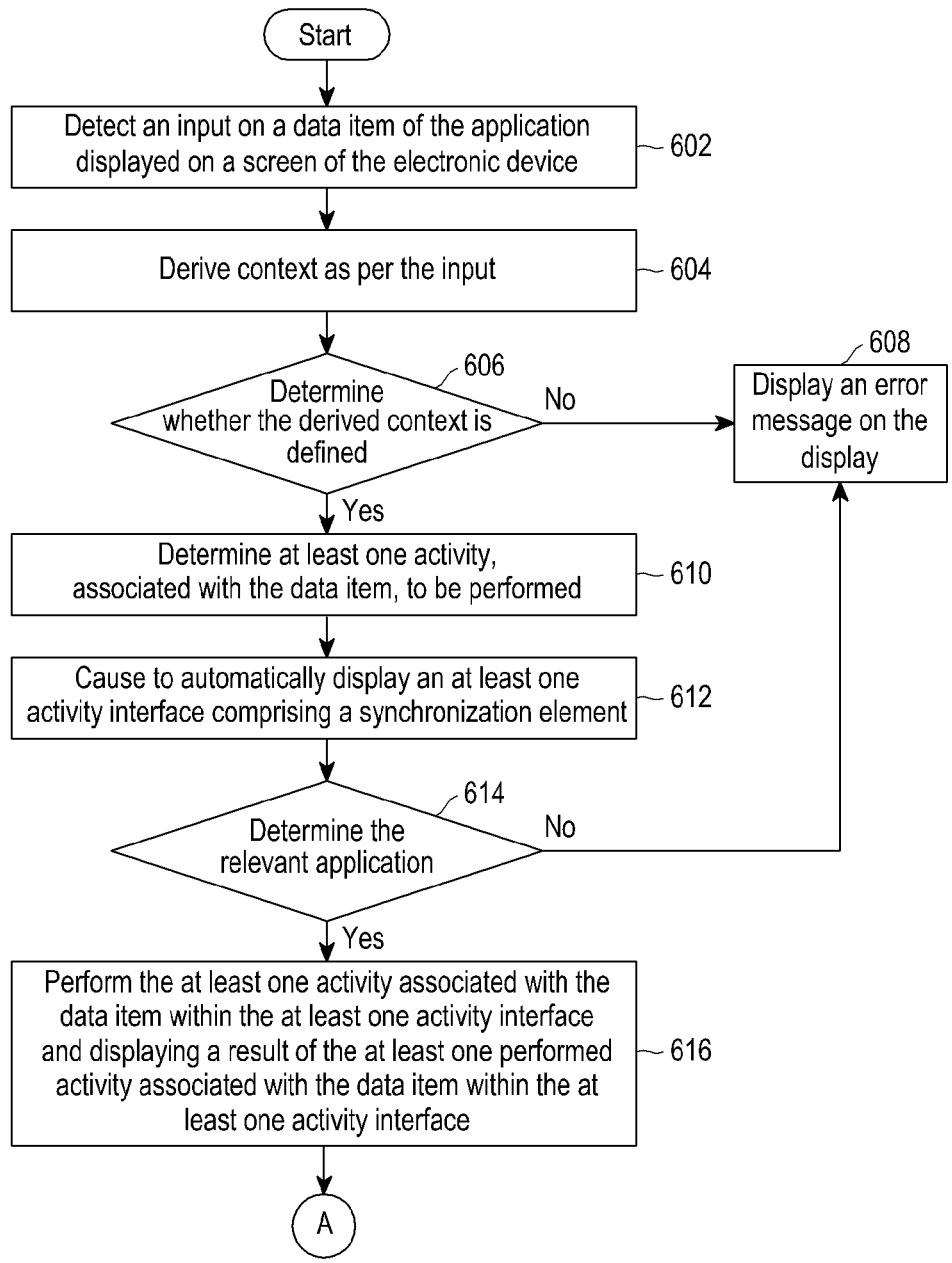
[Fig. 6a]

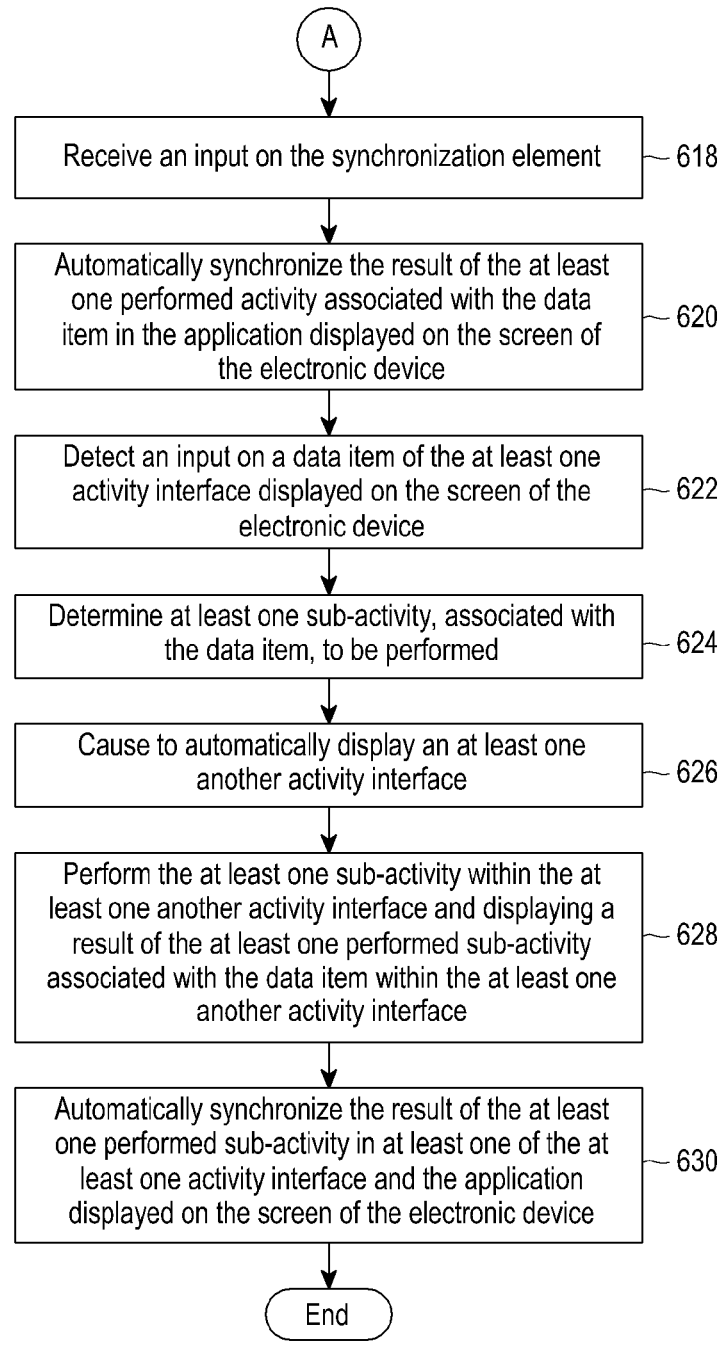
[Fig. 6b]

[Fig. 7a]
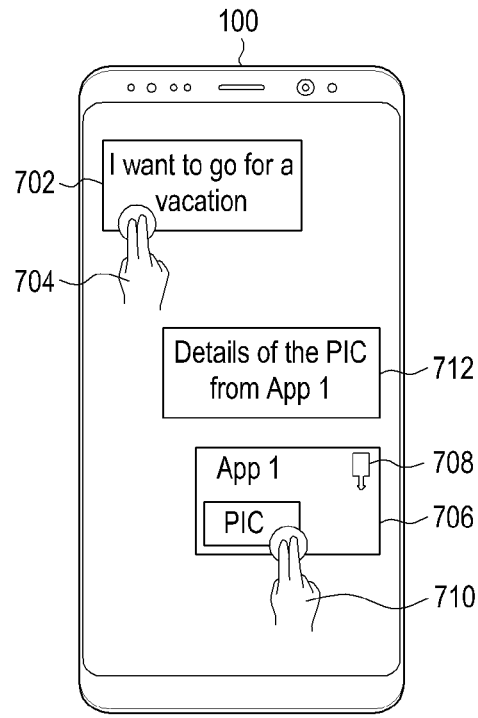
[Fig. 7b]
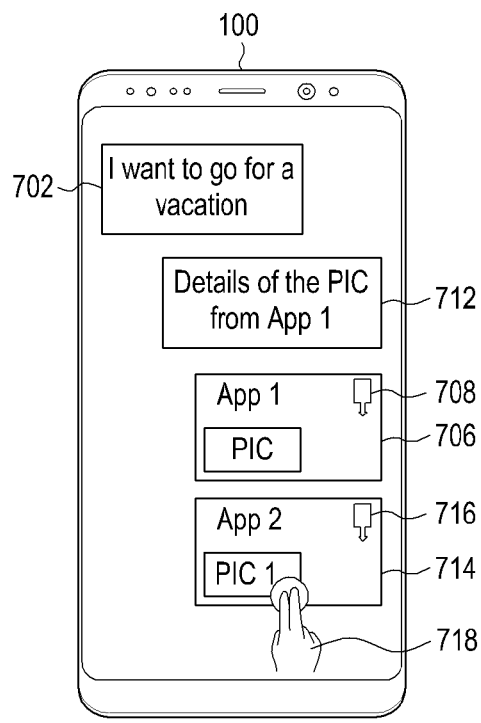

[Fig. 7c]
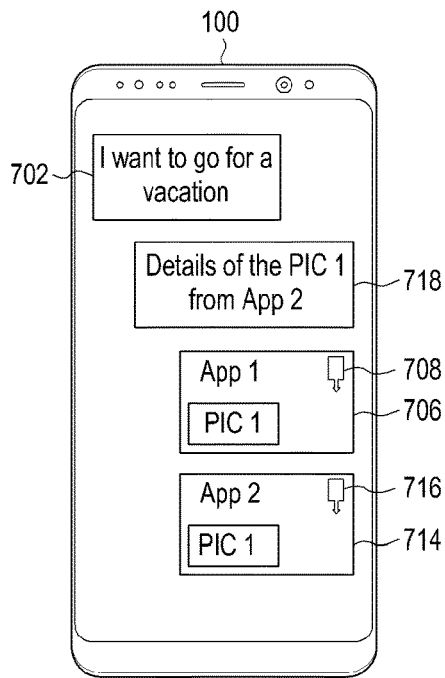
[Fig. 8]
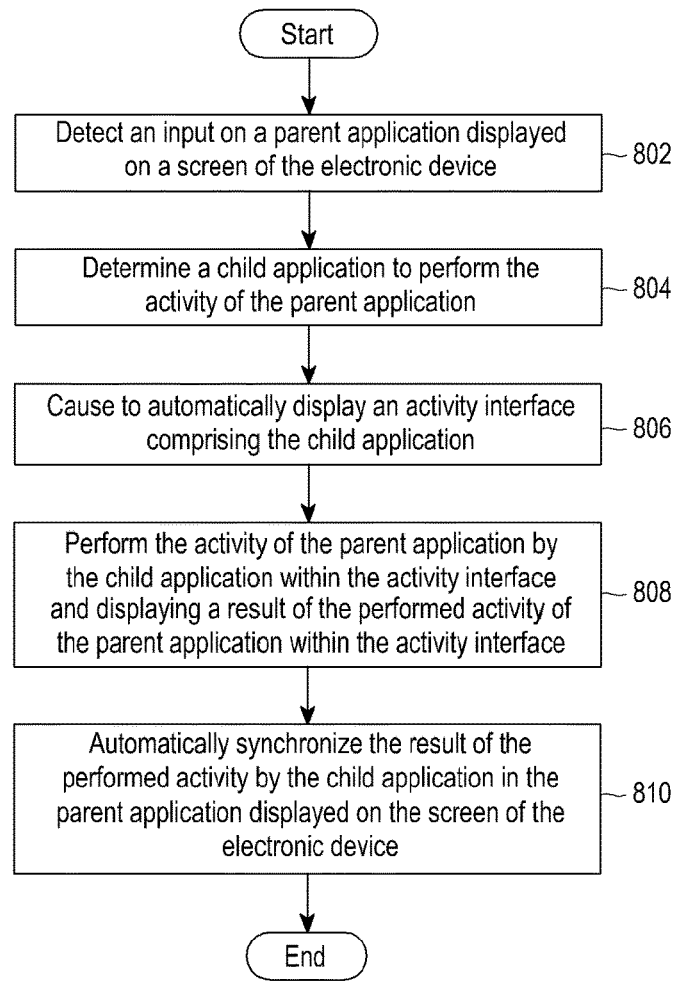

[Fig. 9a]
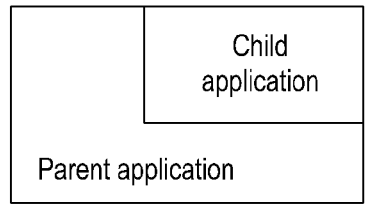
[Fig. 9b]
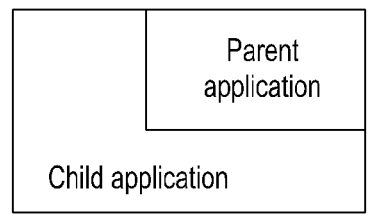
[Fig. 9c]
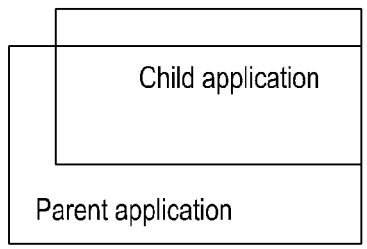
[Fig. 10a]
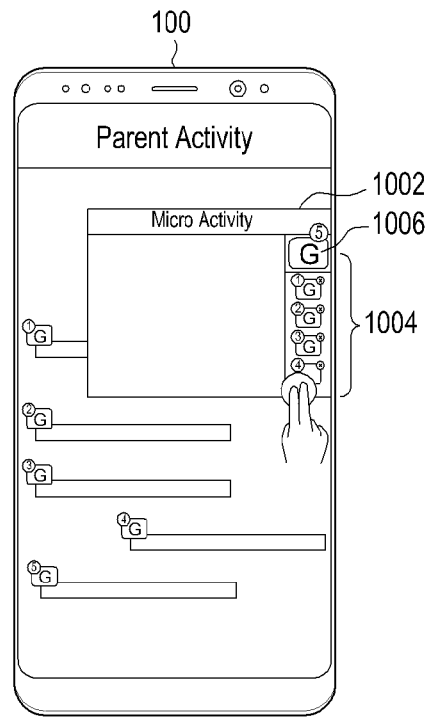

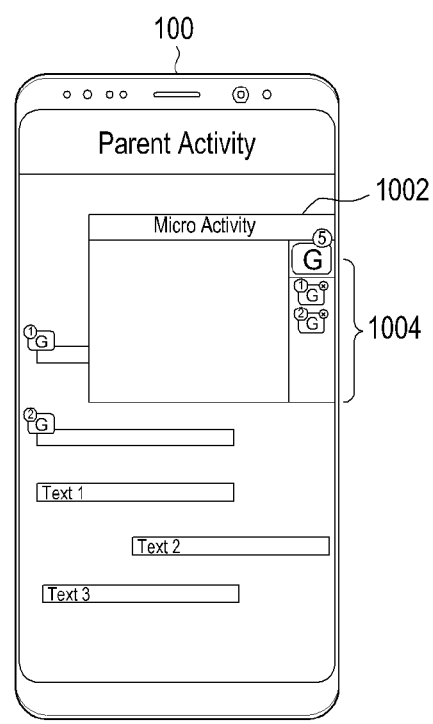
[Fig. 10b]

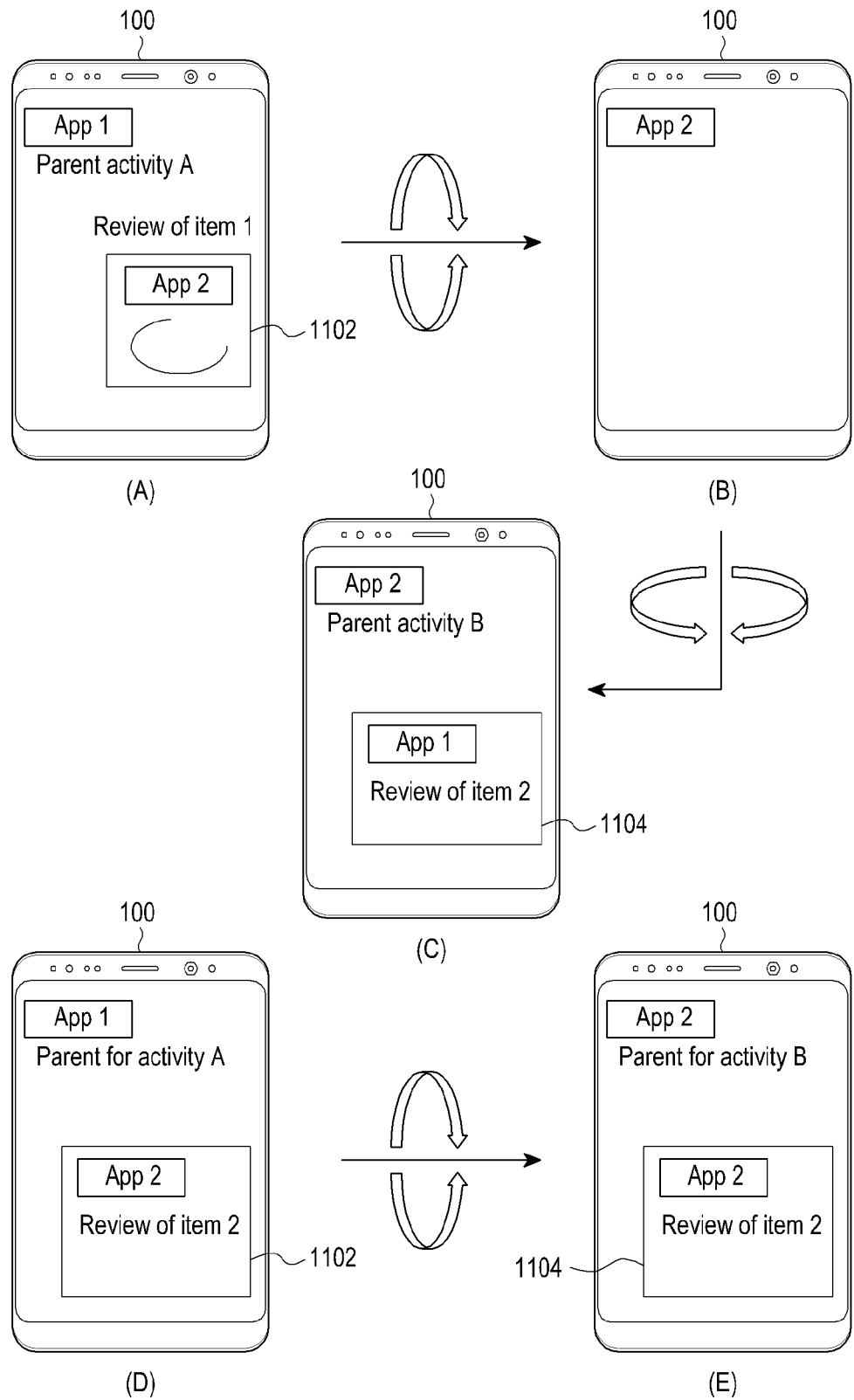
[Fig. 11]

[Fig. 12]
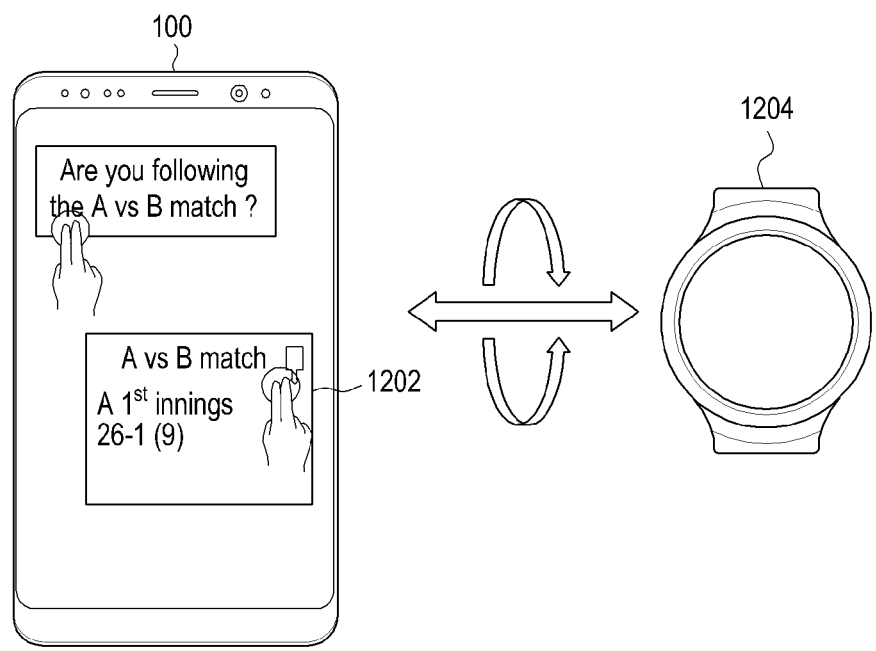
[Fig. 13]
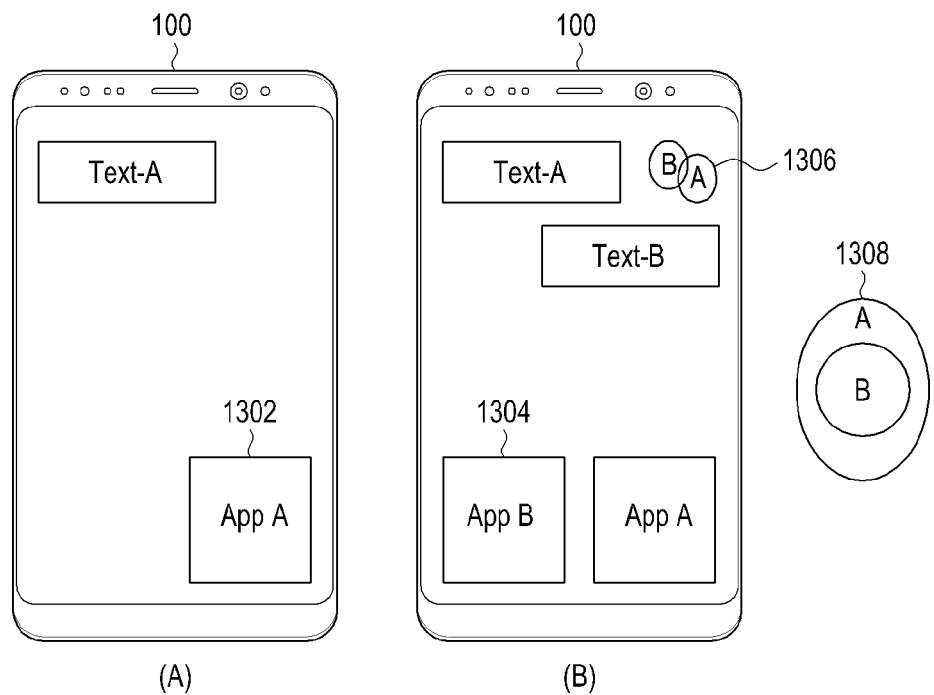

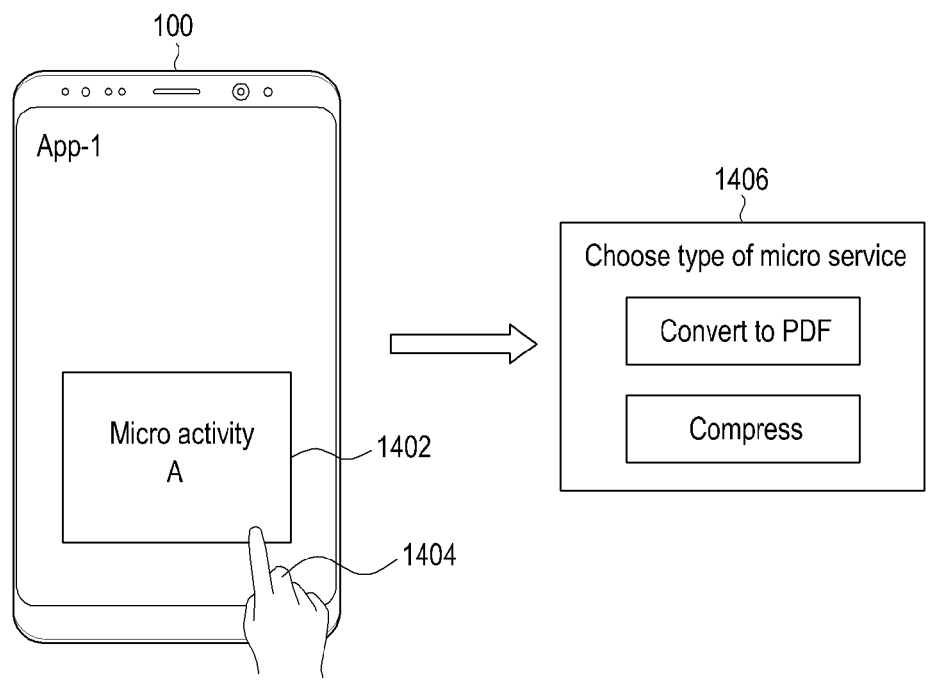
[Fig. 14]

METHOD AND ELECTRONIC DEVICE FOR AUTOMATICALLY MANAGING ACTIVITIES OF APPLICATION

CROSS-REFERENCE TO RELATED APPLICATION(S)

This application is a U.S. National Stage application under 35 U.S.C. § 371 of an International application number PCT/KR2018/011788, filed on Oct. 5, 2018 which was based on and claimed priority of an Indian Provisional Patent Application No. 201741035820 filed on Oct. 9, 2017 in the Indian Intellectual Property Office, the disclosure of each of which is incorporated by reference herein in its entirety.

BACKGROUND

1. Field

The embodiments herein generally relate to a content management and multi-tasking thereof. More specifically, the embodiments herein is directed to a method and electronic device for automatically managing activities of an application.

2. Description of the Related Art

In general, a data processing device (for e.g., electronic device such as mobile phone, laptop, computer, etc.,) includes and/or supports a plethora of applications configured to perform a desired task required by a user of the data processing device. For e.g., if the user wants to buy a shirt then the user can access any of an e-commerce application currently available in order to explore the shirt(s) available therein.

Each application is configured to support and/or provide the information as defined by application provider(s). Thus, the user may leverage one or more applications in order or explore the information which may not be supported and/or provided by a single application. For e.g., different information about a context is present on different applications, so the user requires to-do app to app navigation to see different types of information about the context on different apps.

For e.g. consider a scenario, where user of an electronic device 100 accesses two applications (first application and second application) simultaneously to view related contents therein. Now, when the user interacts with the first application, a state 1 of the first application changes accordingly. As the user was viewing the contents related to the first application in the second application, the contents in the second application may also require the desired changes to that of the state 1 of the first application. Accordingly, in the conventional methods and systems, the contents in the second applications needs to be changed manually by the user, whenever there is any change in the contents rendering in the first application which thereby involves a lot of hassle. Thus, hindering the user experience (as shown in FIG. 1).

Thus, it is desired to address the above mentioned disadvantages or other shortcomings or at least provide a useful alternative.

SUMMARY

The principal object of the embodiments herein is to provide a method for automatically managing activities of an application.

Another object of the embodiments herein is to provide a method for performing an intended activity of a user within an activity interface displayed on a User Interface (UI) of the electronic device displaying a data item.

Another object of the embodiments herein is to provide a method for automatically synchronizing a result of the at least one performed intended activity associated with the data item in the application displayed on the screen of the electronic device. Thus, the user can therefore avoid switching or move back and forth between the applications in order to perform the intended activity.

Another object of the embodiments herein is to provide a method for dynamically synchronizing a state of multiple child applications which are dependent on parent applications.

Another object of the embodiments herein is to provide a method for establishing a bilateral communication connection between the application and at least one application performing the intended activity within the activity interface.

Another object of the embodiments herein is to provide a method for automatically synchronizing the result of the at least one performed sub-activity in at least one of the at least one activity interface and the application displayed on the screen of the electronic device.

Another object of the embodiments herein is to provide a method for displaying multiple activity interfaces, performing the intended activity, within the UI of the electronic device displaying the data item.

Another object of the embodiments herein is to provide a method for chaining the multiple activity interface(s) to provide the cascading effect so that a context provided to further activity interface(s) will be taken from the previous activity interface(s) as the user intended activity.

Another object of the embodiments herein is to provide different ways of displaying relation between the saved instances of previous activity interface(s) and their corresponding context so that the UI of the electronic device won't seem cluttered.

Another object of the embodiments herein is to provide a method for dynamically determine the application(s) to perform the at least one activity associated with the data item.

Embodiments herein provide method for automatically managing activities of an application in an electronic device. The method includes detecting by an activity controller an input on a data item of the application displayed on a screen of the electronic device. Further, the method includes causing by the activity controller to automatically display an at least one activity interface and performing the at least one activity associated with the data item within the at least one activity interface, wherein the at least one activity interface comprises a synchronization element to synchronize a result of the at least one performed activity with the application displayed on the screen of the electronic device.

The method further includes causing by the activity controller to display the result of the at least one performed activity associated with the data item within the at least one activity interface. Further, the method includes detecting by a synchronization controller an input performed on the synchronization element. Furthermore, the method includes automatically synchronizing by the synchronization controller the result of the at least one performed activity associated with the data item in the application displayed on the screen of the electronic device.

In an embodiment, the method for determining by the activity controller the at least one activity, associated with the data item, to be performed includes obtaining a context associated with the application, and determining the at least one activity associated with the data item based on the context associated with the application.

In an embodiment, the method for performing by the activity controller the at least one activity associated with the data item within the at least one activity interface includes determining at least one application to perform the at least one activity associated with the data item, and performing the at least one activity associated with the data item within the at least one activity interface using said at least one determined application.

In an embodiment, the at least one application is determined based on at least one of a frequently used application, a user usage pattern, and a machine learning, and wherein the at least one determined application is at least one of available in the electronic device and available on a network.

In an embodiment, the method further includes detecting by the activity controller an input on a data item of an at least one activity interface displayed on the screen of the electronic device. Further, the method includes determining by the activity controller at least one sub-activity associated with the activity of the data item to be performed. Further, the method includes causing by the activity controller to display an at least one another activity interface. Further, the method includes performing by the activity controller the at least one sub-activity within the at least one another activity interface and displaying a result of the at least one performed sub-activity associated with the data item within the at least one another activity interface. Furthermore, the method includes automatically synchronizing by the activity controller the result of the at least one performed sub-activity in at least one of the at least one activity interface and the application displayed on the screen of the electronic device.

In an embodiment, the method for determining by the activity controller at least one sub-activity associated with the activity of the data item to be performed includes obtaining a context associated with the application and a context associated with the at least one activity interface. Further, the method includes determining the at least one sub-activity based on the context associated with the application and the context associated with the at least one activity interface.

In an embodiment, the method further includes detecting by the activity controller an input on a data item of the application displayed on the screen of the electronic device. Further, the method includes determining by the activity controller at least one another activity associated with the data item to be performed. Furthermore, the method includes preserving by the activity controller said at least one activity in the at least one activity interface. Further, the method includes performing by the activity controller the at least one another activity associated with the data item within the at least one activity interface and displaying a result of the at least one performed another activity associated with the data item within the at least one activity interface. Furthermore, the method includes automatically synchronizing by the activity controller the result of the at least one performed another activity associated with the data item in the application displayed on the screen of the electronic device.

In an embodiment, a number of persevered activities are dynamically grouped and marked in the at least one activity interface, and wherein the number of persevered activities are dynamically grouped based at least one of a task type, a context type, an application type.

In an embodiment, the method further includes synchronizing by the activity controller at least one of the at least one activity interface and the at least one another activity interface with at least one of wearable device and other electronic devices.

In an embodiment, the method for automatically synchronizing the result of the performed activity by the child application with the parent application displayed on the screen of the electronic device includes detecting an input performed on a synchronization element of the activity interface. Further, the method includes automatically synchronizing the result of the at least one performed activity by the child application with the parent application displayed on the screen of the electronic device.

Embodiments herein provide method for automatically managing activities of an application in an electronic device. The method includes detecting by an activity controller an input on a parent application displayed on a screen of the electronic device. Further, the method includes determining by the activity controller a child application to perform the activity of the parent application. Further, the method includes causing by the activity controller to automatically display an activity interface comprising the child application. Further, the method includes performing by the activity controller the activity of the parent application by the child application within the activity interface and displaying a result of the performed activity of the parent application within the activity interface. Furthermore, the method includes automatically synchronizing by the activity controller the result of the performed activity by the child application in the parent application displayed on the screen of the electronic device.

In an embodiment, the method further includes detecting by the activity controller an invert relationship event at the electronic device, and dynamically updating by the activity controller a relationship between the parent application and the child application by inverting the relationship, wherein inverting the relationship comprises making the parent application as the child application and the child application as the parent application.

In an embodiment, the child application is determined based on at least one of a frequently used application, a user usage pattern, and a machine learning, and wherein the child application is at least one of available in the electronic device and available on a network.

In an embodiment, the method further includes detecting by the activity controller an input on the child application within the activity interface displayed on the screen of the electronic device. Further, the method includes determining by the activity controller another child application to perform at least one sub-activity associated with the activity of the parent application. Further, the method includes causing by the activity controller to automatically display another activity interface comprising another child application. Further, the method includes performing by the activity controller the at least one sub-activity by the child application within the activity interface and displaying a result of the at least one performed sub-activity within the activity interface. Furthermore, the method includes automatically synchronizing by the activity controller the result of the at least one performed sub-activity in at least one of the parent application and the child application displayed on the screen of the electronic device.

In an embodiment, the method for determining the sub-activity of the activity includes obtaining by the activity controller a context associated with the parent application and a context associated with the child application. Furthermore, the method includes determining by the activity controller the at least one sub-activity based on the context associated with the application and the context associated with the child application.

In an embodiment, the method further includes synchronizing the child application displayed within the activity interface with at least one of wearable device and other electronic devices.

Accordingly, the embodiments herein provide an electronic device for automatically managing activities of an application. The electronic device includes a memory comprising the application. Further, the electronic device includes a processor coupled to the memory, and an activity controller, operably coupled to the memory and the processor, configured to detect an input on a data item of the application displayed on a screen of the electronic device. Further, the activity controller can be configured to determine at least one activity, associated with the data item. Further, the activity controller can be configured to cause to automatically display an at least one activity interface and perform the at least one activity associated with the data item within the at least one activity interface, wherein the at least one activity interface comprising a synchronization element to synchronize a result of the at least one performed activity with the application displayed on the screen of the electronic device.

Accordingly, the embodiments herein provide an electronic device for automatically managing activities of an application. The electronic device includes a memory comprising the application. Further, the electronic device includes a processor coupled to the memory, and an activity controller, operably coupled to the memory and the processor, configured to detect an input on a parent application displayed on a screen of the electronic device. Further, the activity controller can be configured to determine a child application to perform an activity of the parent application. Further, the activity controller can be configured to cause to automatically display an activity interface comprising the child application. Further, the activity controller can be configured to perform the activity of the parent application by the child application within the activity interface and displaying a result of the performed activity of the parent application within the activity interface. Furthermore, the activity controller can be configured to automatically synchronize the result of the performed activity by the child application in the parent application displayed on the screen of the electronic device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This method is illustrated in the accompanying drawings, throughout which like reference letters indicate corresponding parts in the various figures. The embodiments herein will be better understood from the following description with reference to the drawings, in which:

FIG. 1 is an example scenario in which an unsynchronized states between a first application and a second application is demonstrated, according to prior art;

FIG. 2 is an example scenario in which an activity of a parent application is performed within an activity interface displayed on a screen of an electronic device, according to embodiments as disclosed herein;

FIG. 3 is block diagram illustrating various hardware components of the electronic device, according to embodiments as disclosed herein;

FIG. 4 is a block diagram illustrating various hardware components of an activity controller for performing an activity within an activity interface, according to embodiments as disclosed herein;

FIG. 5 is a block diagram illustrating various hardware components of an activity controller and operation(s) performed thereof for demonstrating activity chain mechanism, according to embodiments as disclosed herein;

FIG. 6 is a flow chart illustrating a method for managing activities of an application, according to embodiments as disclosed herein;

FIGS. 7a-7c is an example scenario in which a sub-activity is identified and synced with the at least one activity interface and the application, according to embodiments as disclosed herein;

FIG. 8 is a flow chart illustrating a method for managing relationship between a parent application and a child application, according to embodiments as disclosed herein;

FIGS. 9a-9c is an example scenario in which the relationship between the parent application and the child application is established, according to embodiments as disclosed herein;

FIGS. 10a-10b is an example scenario in which activity interface clusters are arranged on a UI of an activity interface(s) displayed on the screen of the electronic device, according to embodiments as disclosed herein;

FIG. 11 is an example scenario in which display of the activity interface of the electronic device is synced with other electronic device, according to embodiments as disclosed herein;

FIG. 12 is another example scenario in which display of the activity interface of the electronic device is synced with a secondary electronic device, according to embodiments as disclosed herein;

FIG. 13 is another example scenario in which multiple activity interfaces are stacked on the screen of the electronic device, according to embodiments as disclosed herein; and FIG. 14 is an example scenario in which micro services are invoked on the screen of the electronic device, according to embodiments as disclosed herein.

DETAILED DESCRIPTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, engines, controllers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Embodiments herein provide a method and an electronic device for automatically managing activities of an application. The method includes detecting by an activity controller an input on a data item of the application displayed on a screen of the electronic device. Further, the method includes determining by the activity controller at least one activity, associated with the data item, to be performed. Further, the method includes causing by the activity controller to automatically display an at least one activity interface. Further, the method includes performing by the activity controller the at least one activity associated with the data item within the at least one activity interface and displaying a result of the at least one performed activity associated with the data item within the at least one activity interface. Furthermore, the method includes automatically synchronizing by the activity controller the result of the at least one performed activity associated with the data item in the application displayed on the screen of the electronic device.

Unlike to conventional methods and systems, the proposed method can be used to automatically synchronize different state(s) of the application with state(s) of another application, meaning is that when the content in the state 1 of the application changes then the state 1 of another application also changes accordingly (or vice versa).

Unlike to conventional methods and systems, the proposed method can be used to provide seamless multi-tasking experience to the user by executing the sub instance of the application with predefined arguments, based on the context by the parent application from where the requirement of the multi-tasking originated.

Unlike to conventional methods and systems, the proposed method can be used synchronize the sub-instances/chained to either provide result back to the parent application (pinning) or provide input to next sub-instance (chaining). Thus, the user can interact with the previously traversed applications immediately, as the activity interfaces are preserved on the UI of the electronic device. Further, the proposed method can be used to reduce app switching, which would improve a life cycles of a battery in the electronic device, as every time a new full application is not loaded.

Referring now to the drawings, and more particularly to FIGS. 2 through 14, where similar reference characters denote corresponding features consistently throughout the figures, there are shown preferred embodiments.

FIG. 2 is the example scenario in which the activity is performed within an activity interface 206 displayed on the screen of an electronic device 100, according to embodiments as disclosed herein.

Consider a scenario in which the user of the electronic device 100 accesses an Application 1. Let the Application 1 considered here be a messaging application. Once, the electronic device 100 receives a message 202 from a sender, the received messaged is therefore displayed within a UI of the messaging application. The message 202 includes a text "need to buy a shirt".

In the conventional methods and systems, in order to buy the shirt, the user switches to/access another application (not shown). Another application can be, for e.g., shopping application, e-commerce applications, etc. Further, if the electronic device 100 receives another message ("buy shoes also", not shown) from the same sender (or from different sender) then the user, in order to view another message, navigates back to the messaging application from another application, and starts a new search for the "shoes" in another application or may access a new application for the same. Thus, involving a cumbersome process in order to perform the activity associated with the message 202/another message. The proposed method can be therefore be used to reduce/eradicate the aforementioned cumbersome process as detailed below.

According to the proposed method, once a user input 204 is detected on the message 202, then the electronic device 100 can be configured to automatically identify the activity associated with the message 202 (activity to be performed by the user). The activity such as "need to buy shirt". Further, according to the proposed method, the electronic device 100 can be configured to automatically perform the activity within an activity interface 206 displayed on the screen of the electronic device 100. Thus, unlike to conventional method and systems, the proposed method can be used to provide (i.e., overlay) the activity interface 206 on the screen of the electronic device 100. The activity interface 206 can be configured to execute the activity therein, without requiring the user to switch to another application. Further, the electronic device 100 can be configured to display a result (displaying shirts) of the activity associated within the activity interface 206 (as shown in FIG. 2, (A)).

Further, when the user of the electronic device 100 selects (user input 204) the desired shirt to buy (as shown in FIG. 2, (B)) then the result can automatically be updated in the Application 1. As seen in FIG. 2(C), a hyperlink of the selected shirt is automatically fetched and displayed on the screen of the messaging application.

FIG. 3 illustrates a block diagram of various hardware components of the electronic device 100, according to embodiments as disclosed herein.

In an embodiment, the electronic device 100 can be, but not limited to, a laptop, a desktop computer, a mobile phone, a smart phone, Personal Digital Assistants (PDAs), a tablet, a phablet, a consumer electronic device, a dual display device, edge display, or any other electronic device. In another embodiment, the electronic device 100 can be a wearable device such as, but not limited to, a smart watch, a smart bracelet, a smart glass, or the like. In yet another embodiment, the electronic device 100 can be Internet of things (IoT) device.

The electronic device 100 includes a display 110 (e.g., a Cathode Ray Tube (CRT) display, a Liquid Crystal Display (LCD), Organic Light-Emitting Diode (OLED), a Light-emitting diode (LED), a gesture detector 120, an activity controller 130, a synchronization controller 140, a processor 150 (e.g., Central processing unit (CPU), Graphics processing unit (GPU), hardware chipset, etc.) communicatively coupled to a memory 160 (e.g., a volatile memory and/or a non-volatile memory). The memory 160 includes storage locations configured to be addressable through the processor 150, and a communicator 170.

In an embodiment, the display 110 can be configured to display a data item of the application(s). In one or more embodiments, the data item includes, without limitation, a graphical element i.e., icon, content, text, image, object, or the like.

The gesture detector 120 can be configured to detect a gesture input provided by the user of the electronic device 100. In another embodiment, the gesture detector 120 can be configured to detect the gesture input automatically defined by the processor 150 and/or pre-configured and stored in the memory 160.

The activity controller 130 can be configured to communicate with the synchronization controller 140, the processor 150, the memory 160, and the communicator 170. In one or more embodiments, the activity controller 130 is responsible for identifying the context associated with the data item, identifying the activity from the context, invoking an activity interface, and performing the activity within the activity interface. The activity controller 130, further, can be configured to determine one or more applications capable of performing the identified activity (operational details of the activity controller 130 is illustrated and explained in conjunction with FIG. 4 & FIG. 5).

In one or more embodiments, the synchronization controller 140 is responsible for automatically synchronizing the result of the activity, performed within the activity interface, with the application. For e.g., in furtherance to the activity i.e., "need to buy shirt", the user of the electronic device 100 may select the "desired shirt" provided by the application within the activity interface. The result (i.e., the selected desired shirt) is automatically updated within the screen of the electronic device 100 displaying the application. In or more embodiments, the result can be provided in a form of the hyperlink of the selected desired shirt, screen short of the selected desired shirt, image of the selected desired shirt, details of the selected desired shirt, or the like. Thus, the synchronization controller 140 enables a bilateral communication connection between the application and the activity performed within the activity interface (or, the bilateral communication connection between the application and an application performing the activity within the activity interface).

In an embodiment, the memory 160 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 160 may, in some examples, be considered a non-transitory storage medium. However, the term "non-transitory" should not be interpreted that the memory 160 is non-movable. In some examples, the memory 160 can be configured to store larger amounts of information than the memory. In certain examples, a non-transitory storage medium may store data that can, over time, change (e.g., in Random Access Memory (RAM) or cache).

The communicator 170 can be configured to communicate internally with the hardware elements of the electronic device 100 and externally with other plurality of other electronic devices ((clients, not shown), network, and server.

FIG. 4 is a block diagram illustrating various hardware components of the activity controller 130 for performing the activity within the activity interface, according to embodiments as disclosed herein.

Referring to the FIG. 4, in one or more embodiments the display 110 displays one or more data items 402 & 404 within the UI of the App-1. In example embodiments, the App-1 can be the messaging application, a Social Networking Site (SNS), a gallery application, a video application, an e-commerce application, a native applications, a non-native applications, etc. The data item 402 includes the context i.e., "please check the document" and the data item 404 includes the document that's need to be evaluated by the user of the electronic device 100. In order to evaluate the document, the user of the electronic device 100 may provide a gesture input 406 on the data item 404 (as shown in a state (A) of the electronic device 100).

In response to the gesture input 406 on the data item 404, the display 110, coupled to the gesture detector 120, can be configured to invoke the activity controller 130 disclosed in FIG. 3.

Activity Controller 130:

In one or more embodiments, the activity controller 130 includes a data item selection engine 131, a Natural Language Processing (NLP) engine 132, an argument parser 133, an application selector 134, a data parser 135, and a data rendering engine 136.

The data item selection engine 131 is responsible for the data tem (i.e., node) selection from where the context is to be processed. In example embodiments, the data item selection engine 131 is a stack of various accessibility layers using which the context from the selected data item will be processed. In another embodiment, the data item selection engine 131 can monitor the gestures received on the at least one data item and identify the type of activity interface to be invoked. In yet another embodiment, the data item selection engine 131 can be a type of framework providing different services to the various hardware components of the electronic device 100.

Further, the data item selection engine 131 can be configured to provide an inter process communication of different services running under different process IDs (PIDs). For e.g., the item selection engine 131 can be configured to provide the Interface Definition Language (IDL) for different PIDs. Furthermore, the data item selection engine 131 can be configured to provide a service native to an operating system of the electronic device. This is to say that, the data item selection engine 131 exposes an API to read the context of the data item(s) displayed on the display 110.

In furtherance, to the selection of the data item, the data item selection engine 131 communicates the context derived from the data item to the NLP engine 132. The NLP engine 132 involves a machine learning techniques to recognize and/or analyze the context of the selected data item in order to derive a meaning (e.g., activity) from the context presented in a natural language. In one or more embodiments, the NLP engine 132 includes a node data reader (not shown)

configured to read the data present on the node that the user has selected. Further, the NLP engine 132 includes a schema parser (not shown) configured to identify whether the context is already a predefined schema. If the schema is found (previously stored in the memory 160) then the context is not communicated to the NLP engine 130, and the activity interface comprising the relevant application (capable of the performing the activity associated with the context) is invoked and displayed on the display 110 (as shown in a state (B) of the electronic device 100).

If the schema is not a pre-defined schema, then the NLP engine 132, in one or more embodiments, can be configured to process the context. In one or more embodiments, the NLP engine 132 includes a text converter (not shown) configured to convert the context and/or data/text associated with the context into a standard format (e.g., American Standard Code for Information Interchange (ASCII)), a string vectorizer unit (not shown) configured to count the frequency of all the words that appear in the sentence, a stop words remover unit (not shown) configured to remove all common terms present in the sentence based on the language (since it will not take part in the context), a fit transform unit (not shown) configured to combine the fitting and transforming process through which the data can be transformed into a machine readable form (for e.g. the fit transform unit may utilize a Naive-Bayes technique for string classification).

Further, the NLP engine 132 includes a feature name extractor unit (not shown) configured to recognize the named entities present in the transformed data and to perform POS (Part of speech) tagging for recognized named entities. Further, the NLP engine 132 includes a string tokenizer unit (not shown) configured to tokenize all the NE (Named Entities) for further processing of the context, a relation finder (RF) unit (not shown) configured to derive a relation between the derived NE, a subject finder unit (not shown) configured to find the subject in the sentence based on the relation derived by the RF unit, a subject priority queue handler unit (not shown) configured to prioritize one or more NE identified as subject based on a predefined logic. Furthermore, the NLP engine 132 can be configured to find a meaning for the subject in order to associate with a particular category (for e.g. T-Shirt can be associated with clothing category), identify suitable application for the category that is identified for the subject, create argument for the suitable application based on the application, subject category and the subject, and determine whether any errors have occurred during the context derivation process and will report back to the user on the display 110.

In one or more embodiments, the output of the NLP engine 132 can be communicated with the argument parser 133. In an embodiment, the argument parser 133 can be configured to select an appropriate source to identify the application and load it on the display 110. Once, the type of application is identified, then the application selector 134 can configured to identify whether the activity to be performed can be executed by the activity interface itself (e.g., activity self-handler), because an activity interface framework is embedded with certain common functionality and can perform it for the user without a need for a 3rd party application(s). Further, the application selector 134 can be configured to identify whether the type of application configured to perform the activity is available, locally, within the electronic device 100. Furthermore, in response to the identifying the type of application configured to perform the activity is not available within the electronic device 100, then the application selector 134 can be configured to identify any of network application.

In one or more embodiments, the electronic device 100 is coupled (e.g., communicatively), through a network 410, to a server 412. Further, the server 412 communicates, through the network 410, with the electronic device 100 to provide multiple functionalities thereof. In example embodiments, the functionalities can include, performing the operations of the user desired activity by using any of the network application located therein, recommendation of the relevant network application(s) to perform the user desired activities, remotely storage of the result, etc. In example embodiments, the network can be Internet, a wireless network, a cellular network, a Wide Area Network (WAN), a local area network (LAN), cloud network, or any other type of network configured to allow exchange of communications between the electronic device 100 and the server 412. In another embodiment, the server 412 can be within the network 410 (such a cloud environment). The server 412 can be, for e.g., data center, a data processing device, or the like.

In one or more embodiments, the network application(s) of the server 412 can be hosted by a service provider. That is, the service provider hosts (e.g., performs one or more operations of) the network application(s) and the user can access functionalities online through a software-as-a-service (SaaS) model.

Further, the output of the argument parser 133 and the application selector 134 is provided to an output framework which includes a data parser 135 and a data rendering engine 136. In one or more embodiments, the output framework control a display characteristics (e.g., UX, UI etc., of the data item) displayed within the activity interface. Based on the output from the argument parser 133 and the application selector 134 the output framework will load the selected application onto the electronic device 100 (download it from the SaaS if required) with the arguments that were formatted for the selected application by the NLP engine 132, and will render the display frames in to the activity interface.

In one or more embodiments, the data parser 135 can be configured to load the selected application onto the electronic device 100. In one or more embodiments, the data rendering engine 136 can be configured to output the result on the display 110 (as shown in state (B) of the electronic device 100 an activity interface 408 launches the document of the data item 404 using the selected application).

Further, the activity controller 130 can communicate with the synchronization controller 140 which can be further configured to monitor the results of the activity performed within the activity interface 408. In one or more embodiments, the synchronization controller 140 includes a synchronization element which can be configured to synchronize the result of the activity with the App-1. In an example embodiments, the synchronization element synchronizes the result of the activity with the App-1 based on the gesture input received on the synchronization element. In another example embodiments, the synchronization controller 140 can automatically provide instructions, dynamically, to synchronize the result of the activity with the App-1 based on pre-defined criteria. In one or more embodiments, the synchronization controller 140 can analyze the results i.e., if they are compatible with the App-1 and will be formatted for and forwarded to processor 150 to be processed, and the App-1 may be reloaded with the new data if needed.

Although not shown, in yet another embodiment, the activity controller 130 can be remotely located at the server 412. The electronic device 100 can therefore communicate with the server 412 through the network 410.

FIG. 5 is a block diagram illustrating various hardware components of the activity controller 130 and operation(s) performed thereof for demonstrating activity chain mechanism, according to embodiments as disclosed herein.

Referring to the FIG. 5, in one or more embodiments, the display 110 displays one or more data items 502 & 504 within the UI of the App-1. The data item 502 includes the context i.e., "please find me a black shirt". The user of the electronic device 100 may provide a gesture input 506 on the data item 502 (as shown in a state (A) of the electronic device 100).

In response to the gesture input 506 on the data item 502, the display 110, coupled to the gesture detector 120, can be configured to invoke the activity controller 130 disclosed in FIG. 3. The technical operations of the activity controller 130 is detailed above (please refer to the FIG. 4). In conjunction with the FIG. 4, if the user of the electronic device 100 further drags the gesture input 506 on to the data item 504, then the process will be restarted in addition to the earlier process being executed within the same activity interface and/or a new activity interface (i.e., demonstrating the synchronization process). As shown in state (B) of the electronic device 100 an activity interface 508(a) performs the activity associated with the data item 502 and an activity interface 508(b) performs the activity associated with the data item 504. Further, the display 110 can be configured to preserve the one or more activity interfaces which are synchronized with the App-1.

In another embodiment, if the activity controller 130 identifies that only one activity interface is required to perform the activity associated with the data item 502 and the activity associated with the data item 504, then a single activity interface comprising multiple pages of the single application is displayed.

FIG. 6 is a flow chart illustrating a method for managing activities of the application, according to embodiments as disclosed herein.

Referring to FIG. 6, at step 602, the method includes detecting the input on the data item of the application displayed on the screen of the electronic device 100. In an embodiment, the method allows the gesture detector 120 to detect the input on the data item of the application displayed on the screen of the electronic device 100.

Further, at step 604, the method includes deriving context as per the input provided on the data item of the application. In an embodiment, the method allows the data item selection engine 131 to derive context as per the input provided on the data item of the application.

Further, at step 606, the method includes determining whether the derived context is defined. In an embodiment, the method allows the NLP engine 132 to determine whether the derived context is defined.

If, at step 606, the NLP engine 132 determines that the derived context is not defined, then at step 608, the method includes displaying an error message on the display 110.

If, at step 606, the NLP engine 132 determines that the derived context is defined, then at step 610, the method includes determining the at least one activity, associated with the data item, to be performed. In an embodiment, the method allows the NLP engine 131 to determine the at least one activity, associated with the data item, to be performed.

At step 612, the method includes causing to automatically display the at least one activity interface comprising the synchronization element. In an embodiment, the method allows the display 110 to automatically display the at least one activity interface comprising the synchronization element.

At step 614, the method includes determining the relevant application. In an embodiment, the method allows the application selector 134 to determine the relevant application.

At step 616, the method includes performing the at least one activity associated with the data item within the at least one activity interface and displaying the result of the at least one performed activity associated with the data item within the at least one activity interface. In an embodiment, the method allows the activity controller 130 to perform the at least one activity associated with the data item within the at least one activity interface and display the result of the at least one performed activity associated with the data item within the at least one activity interface.

At step 618, the method includes receiving the input (e.g., gesture, tap, long press, pre-defined, or the like) on the synchronization element. In an embodiment, method allows the display 110 can be receive the input on the synchronization element.

At step 620, the method includes automatically synchronizing the result of the at least one performed activity associated with the data item in the application (e.g., Appl-1) displayed on the screen of the electronic device 100. In an embodiment, the method allows the synchronization controller 140 to automatically synchronize the result of the at least one performed activity associated with the data item in the application (e.g., Appl-1) displayed on the screen of the electronic device 100.

Further, at step 622, the method includes detecting the input on the data item of the at least one activity interface displayed on the screen of the electronic device 100. In an embodiment, the method allows the activity controller 130 to detect the input on the data item of the at least one activity interface displayed on the screen of the electronic device 100.

Further, at step 624, the method includes determining the at least one sub-activity, associated with the data item, to be performed. In an embodiment, the method allows the NLP engine 132 to determine the at least one sub-activity, associated with the data item, to be performed. In an example embodiments, the sub-activity is activity associated with the data item of the activity interface (as shown in FIG. 8C).

Further, at step 626, the method includes causing to automatically display the at least one another activity interface. In an embodiment, the method allows the data rendering engine 136/display 110 to automatically display the at least one another activity interface.

Further, at step 628, the method includes performing the at least one sub-activity within the at least one another activity interface and displaying the result of the at least one performed sub-activity associated with the data item within the at least one another activity interface. In an embodiment, the method allows the activity controller to performing the at least one sub-activity within the at least one another activity interface and displaying the result of the at least one performed sub-activity associated with the data item within the at least one another activity interface.

Further, at step 630, the method includes automatically synchronizing the result of the at least one performed sub-activity in at least one of the at least one activity interface and the application displayed on the screen of the electronic device 100. In an embodiment, the method allows the synchronization controller 140 to automatically synchronize the result of the at least one performed sub-activity in at least one of the at least one activity interface and the application displayed on the screen of the electronic device 100. In one or more embodiments, the synchronization process is identical to that of the process involved in synchronizing the result of the activity, performed by the activity controller 130, with the application.

In one or more exemplary embodiments, the machine learning techniques can be used to analyse the activities to be performed/already performed by the user based on the context (can be stored in the memory for future reference). When the user of the electronic device 100 detects an input on the object (e.g., image, video clip, etc.,) currently displayed on the UI of a gallery application, then the activity controller 130 determines the context associated with the object, if the context determined is already defined in the context database/memory 160 (for e.g., the context associated can be i.e., sharing of the object in a SNS application) then the activity interface comprising the SNS application is automatically invoked and displayed on the display 110.

In another exemplary embodiment, if the context determined is not defined then the activity controller 130 can determine the activity to be performed based on the context of the object and perform the determined activity within the activity interface. The determined activity in another embodiments, herein, may include sharing with other users, editing, etc. Further, the gesture detector 120 detects an input on a synchronization element associated with the activity interface. In response to the input, the synchronization controller 140 automatically synchronizes the result of the activity performed within the activity interface with the gallery application. In one or more embodiments, if the synchronization is enabled, then a display colour of the synchronization element may be changed from its original display colour indicating that the synchronization is in an active state.

Further, the gesture detector 120 detects an input on the object displayed within the activity interface. As the context is the object within the SNS application post page, so most useful application is for e.g., an Image editor application to edit the object before posting. Thus, an activity interface comprising the Image editor application is invoked and displayed on the display 110. Thus, the synchronization controller 140 can automatically synchronize the result of the activity performed within the activity interface, and with the gallery application. The result comprises the changes to the object executed by using the Image editor application. Thus, based on the synchronization, the result (i.e., edited object) of the Image editor application is reflected (updated) in the gallery application. Thus, demonstrating the bilateral communication connection thereof.

Unlike to conventional methods and systems, the proposed method can be used for seamlessly navigating between the applications. The context is recognized by the framework, which minimizes effort in navigation, and the related content is automatically updated, if a change (in any one of the application or result of the activity) is detected.

FIGS. 7A-7C is an example scenario in which the sub-activity is identified and synced with at least one activity interface and an application, according to embodiments as disclosed herein.

Consider a scenario in which the user of the electronic device 100 selects (by way of a gesture input 704) a message 702 displayed on a UI of the messing application. In response to the gesture input 704, the activity controller 130 can be configured to determine a context (i.e., planning for vacation) associated with the message 702. Based on the context identified the activity controller 130 can be further configured to determine the activity, associated with the context, to be performed by the user. The activity such as exploring the vacation spots, booking the travelling tickets for the vacation spots, or the like. Now, as the activity to be performed by the user is determined, the activity controller 130 can automatically cause to display an activity interface 706 on the UI of the messaging application. The activity interface 706 includes an App-1 (selected based on the context derived from the message 702, capable of performing the activity). Further, the activity interface 706 includes a synchronization element 708 configured to synchronize the result of the activity performed with the messaging application, meaning is that if the user selects the desired vacation spot (by way of an input 710) from the App-1, then the details (hyperlink, name, booking details, etc.,) of the selected vacation spot is automatically updated within the UI messaging application, as shown in a message 712 (as shown in the FIG. 7A).

If the App-1 includes sub-activity associated therewith then, the activity controller 130 can be configured to display another activity interface 714 on the UI of the messaging application. The activity interface 714 includes an App-2 (selected based on the context derived from the data item associated with the App-1) capable of performing the sub-activity. Further, the activity interface 714 includes a synchronization element 716 configured to synchronize the result of the sub-activity performed with the messaging application and the App-1, meaning is that if the user selects the desired vacation spot (by way of an input 718) from the App-2, then the details (hyperlink, name, booking details, etc.,) of the selected vacation spot (PIC 1) is automatically updated within the UI messaging application and with the App-2, as shown in a message 718 (as shown in the FIGS. 7B-7C). Thus, all the activity interfaces (706 & 714) forms a chain.

FIG. 8 is a flow chart illustrating a method for managing relationship between the parent application and the child application, according to embodiments as disclosed herein.

At step 802, the method includes detecting the input on the parent application displayed on the screen of the electronic device 100. In an embodiment, the method allows the gesture detector 120 to detect the input on the parent application displayed on the screen of the electronic device 100.

At step 804, the method includes determining the child application to perform the activity of the parent application. In an embodiment, the method allows the application selector 134 to determine the child application to perform the activity of the parent application.

At step 806, the method includes causing to automatically display the activity interface comprising the child application. In an embodiment, the data rendering engine 136 to automatically display the activity interface comprising the child application.

At step 808, the method includes performing the activity of the parent application by the child application within the activity interface and displaying the result of the performed activity of the parent application within the activity interface. In an embodiment, the method allows the activity controller 130 to perform the activity of the parent application by the child application within the activity interface and display the result of the performed activity of the parent application within the activity interface.

At step 810, the method includes automatically synchronizing the result of the performed activity by the child application in the parent application displayed on the screen of the electronic device 100. In an embodiment, the method allows the synchronization controller 140 to automatically synchronize the result of the performed activity by the child application in the parent application displayed on the screen of the electronic device 100.

FIGS. 9A-9C is an example scenario in which the relationship between the parent application and the child application is established, according to embodiments as disclosed herein.

In general, whenever an application is launched in the activity interface is considered as the child application, and the application from which context is derived is considered as the parent application (as shown in FIG. 9A). In one or more embodiments, the activity controller 130 can be configured to invert relationship between the parent application and the child application. The invert relationship can be performed based on an invert relationship event detected by the activity controller 130, meaning is that the child application can operate as the parent application and the parent application can operate as the child application. When the relationship is inverted the process of fetching context will also invert, i.e., activity interface of the parent application will start fetching context from the child Application (as shown in FIG. 9B). In or more embodiments, one or more visual appearance of the child application and the parent application can be altered dynamically (as shown in FIG. 9C) in which the parent application goes to back stack and the child application is displayed front as a normal activity.

FIGS. 10A-10B is an example scenario in which activity interface clusters are arranged on a UI of the activity interface(s) displayed on the screen of the electronic device 100, according to embodiments as disclosed herein.

In an exemplary embodiments, the propose method can be used to group similar activity interface(s) inside one group. Every group is called activity interface cluster. This logical grouping of activity interface(s) can aid the user in faster accessing and analyzing the large history of activity interface(s). Thus, the user may experience the seamless multitasking as the intended task can be performed faster and smother. In an exemplary embodiments, these activity interface cluster(s) can be displayed on the right side edge of activity interface which will be providing quick history of opened activity interface cluster.

The clustering can be based on, but not limited to, application based cluster and object based cluster. The application based clustering will group activity interfaces belonging to same application root. All activity interface belonging to App-1 will be clustered in the UI of App-1 activity interface cluster. Further, the object based clustering will group activity interfaces belonging to same object root. There are various ways to identify object from the activity interface using crawling & object detection techniques. For e.g., the activity controller 130 can cluster all activity interfaces having T-shirt to cluster called T-shirt.

For e.g., consider a scenario in which the user has launched a cluster of multiple activity interfaces for a G-Market application (as shown in FIG. 10A). In an exemplary embodiments, the multiple activity interfaces can be stacked 1004 and displayed within the UI of an activity interface 1002. The user can perform a gesture input 1006 to terminate the one or more activity interface from the multiple activity interfaces and/or from the cluster (and history) of the activity interfaces stack (as shown in FIG. 10B). Further, each activity interface cluster is represented by a graphical icon along with a corresponding badge number. The graphical icon and badge number of relationship indication will have different graphical icons for each application and the badge number representing one to one mapping from a parent activity (i.e., derived from the context of the date item of the parent application) to the activity performed in the activity interfaces. Every activity interface cluster will have its own icon group and that will uniquely help in identifying cluster group. For e.g., same icon can be applied to all activity interface of that cluster. Thus, when the user opens any activity interface cluster group, list of the activity interfaces will be displayed with the corresponding badge number.

In another embodiment, a special clicked-in mode (which can be invoked by the pre-defined gesture), there will be one to one mapping visually displayed between activity interface, right edge, and the parent application.

In yet another embodiment, a color and a line method of relationship indication can be used to represent the activity interface cluster. Different colors for each activity interface cluster group and line type for each activity interface representing one to one mapping from the parent application to the activity interface. Every activity interface cluster will have its own color group that will uniquely help in identifying cluster group. Same color may be applied to all activity interface cluster.

Further, in still yet another embodiment, the activity interface can be configured to change opacity based on certain conditions i.e., user defined, system defined, etc. For instance, the electronic device 100 can allow the user to set to dis-highlight (dim) the activity interface if the parent application is scrolled. The dim amount can be varied and can configured through settings. The fixed opacity level can also be configured per application which can execute in the activity interface. Thus, the electronic device 100 can allow the user to selectively highlight a certain portion in the activity interface based on the aforesaid conditions. The highlighted region will display in full visibility and the remaining region can be dimmed based on a fixed amount.

Further, at any point in time, the electronic device 100 can allow the user to choose to save the configuration of entire activity interface. Thereafter, if the same condition matches the saved settings will be applied by the activity controller 130. For example, from the parent application A, an activity interface B is opened. The activity interface B is pinned to parent application A by the user. This configuration can be stored in the memory 160. The activity controller 130 will then identify the applications that are current executing either in parent or in micro activity and then calculate the changed settings, the same information will be saved in memory 160. Thus, at any point in future, if the application A and the activity interface B are matched, the activity controller 130 shall apply the stored settings (i.e., the pinning feature will be turned on).

FIG. 11 is an example scenario in which display of the activity interface of the electronic device 100 is synced with other electronic device 1100, according to embodiments as disclosed herein.

The activity controller 130 can be configured to synchronize the activity interfaces, the state of both the parent activity and result of the activity interface of the electronic device 100 with other electronic device 1100. Thus, the state of parent activity in the electronic device 100 which is also the activity in the activity interface at other electronic device 1100 can be synced so that whenever the user make changes to the parent activity in the electronic device 100 the same state gets updated in the activity interface in other electronic device 1100.

For e.g., consider a scenario in which the user of the electronic device 100 has initiated a task in an activity interface 1102 (App-2) from App-1 (as shown in (A)), of FIG. 11). The App-2 in other electronic device 1100 was same as the App-1 in the activity interface 1102 (e.g., the user of the electronic device 100 and the user of the other electronic device 1100 were chatting on same SNS application, as shown in (B)), of FIG. 11). Now, the user of the electronic device 100 shared or synced the parent activity-A with the user of the other electronic device 1100, which will open in an activity interface 1104 (as shown in (C)), of FIG. 11). As due to the synchronization behavior, whenever the user of the electronic device 100 starts seeing review of item 2 in App-1 then the similar changes (review of item) is executed (or updated) in the activity interface 1104 (as shown in (D and E)), of FIG. 11).

FIG. 12 is another example scenario in which result (or, display) of the activity interface at the electronic device 100 is synced with a secondary electronic device 1204, according to embodiments as disclosed herein.

In an embodiment, the activity controller 130 can be configured to transfer a display buffer of an activity interface 1202 to the secondary electronic device 1204 e.g., a connected wearable device, IoT devices, other electronic devices, or the like. This results in increasing user's convenience in cases where the electronic device 100 is out of reach of the user. The secondary electronic device 1204 can execute any application even if it is not installed on the electronic device 100, as the application may be downloaded from the SaaS model. Each activity interface displayed on the electronic device 100 can be transferred to the secondary electronic device 1204, or if in case the content that is being displayed is large, a portion of the activity interface 1202 can also be transferred to the secondary electronic device 1204.

In an embodiment, the activity interface 1202 associated with a parent application of the electronic device 100 can be configured to either launch (by default) on the electronic device 100/on any other the secondary electronic device 1204. This configuration can be controlled based on by a parent application filter/by category in which the context can fall to.

For example, the user can set activity interface 1202 which executes an instance of "A-shopping" app to launch on the secondary device 1204. In another example, the user can configure the activity interface 1202 to manage the type "sports" to launch on secondary device 120. This behavior can be changed once the activity interface 1202 is displayed on the selected secondary device 1204. And this feature and its conditions can be configured in settings of the electronic device 100.

FIG. 13 is another example scenario in which multiple activity interfaces are stacked on the screen of the electronic device 100, according to embodiments as disclosed herein.

Consider that the user has initiated a task-A in an activity interface 1302 from the App-1 (as shown in (A) of FIG. 13). Further, the user has initiated a second task (task-B) from the App. If the activity interface 1302 was not synced with the App-1, the new activity interface 1304 is launched 1 (as shown in (B) of FIG. 13). Thus, multiple activity interfaces can be launched at the same time. Each activity interface is launched for a particular task from the App-1, due to a display area constraint the multiple activity interfaces can be displayed in minimized mode (shown as 1306). In another embodiment, stacking of activity interfaces can in a form of scrollable list, where each element of list is a cluster of similar activity interfaces (shown as 1308). In an exemplary embodiments, an activity interface mode can be enabled/disabled directly from a notification panel, according to embodiments as disclosed herein.

In another exemplary embodiment, the activity interface can be a non-interactive element, meaning is that the user may not be able to interact with the activity interface. A pre-defined gesture (e.g., anti-clockwise gesture), can be performed by the user, on the display screen of the electronic device 100, to enable the non-interactive feature for the activity interface. The non-interactive feature enables the user to perform different operations (such as calculation, treasures related operations, etc.).

FIG. 14 is an example scenario in which micro services are invoked on the screen of the electronic device 100, according to embodiments as disclosed herein.

Unlike to conventional methods and systems, the activity interface of an application, detailed herein, can be used to provide multiple distinct micro services associated with multiple distinct applications. Meaning is that, the electronic device 100 may not invoke any other application in order to perform a task of the activity interface of the application.

In general micro services can be referred to utility plug-ins, which can modify the output of the activity interface and update the result of the output with the parent application. The micro services provide a feature set to the user to get the data back in the format as required, which otherwise would have required separate applications to do so.

Referring to the FIG. 14, consider a scenario in which the user of the electronic device 100 has initiated a task in an activity interface 1302 from a parent application-1 displayed on the display screen. Once, the electronic device 100 detects a gesture 1404 performed on the activity interface 1402, the electronic device 100 can be configured to display an indication (e.g., popup) 1406 to select the type of micro service required in order to perform the required task. The type of the micro service provided by way of the indication can be automatically determined based on the context of the activity interface 1402. Thus, the selected micro service will be applied, if applicable to the type of output.

For e.g., if the activity to be performed by the activity interface is outputting an image in ".png format" to the application-1, then according to the proposed micro service the user can also has an option to attach ".zip utility" which will take the ".png file", compress it and then send the result back to the application-1 in ?.zip format?. Thus, the result in ".zip format" is received in the application-1, which is more compressed and easy to share in comparison to ".png format".

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for automatically managing activities of an application in an electronic device, comprising:
   detecting an input on a data item of a parent application displayed on a screen of the electronic device;
   determining a child application to perform an activity related to the data item of the parent application;
   displaying an interface comprising the child application on the parent application;
   performing the activity related to the data item of the parent application by the child application within the interface;

displaying a result of the performed activity within the interface;
synchronizing the result of the performed activity by the child application with the parent application;
detecting an invert relationship event; and
in response to detecting the invert relationship event, updating a relationship between the parent application and the child application by inverting the relationship, wherein inverting the relationship comprises operating the parent application as the child application and the child application as the parent application.

2. The method of claim 1, wherein synchronizing the result of the performed activity by the child application with the parent application comprises:
detecting an input performed on a synchronization element of the activity interface; and
synchronizing the result of the performed activity by the child application with the parent application.

3. The method of claim 1, wherein the activity of the parent application is determined by:
obtaining a context associated with the parent application; and
determining an activity to be performed by the child application based on the context associated with the parent application.

4. The method of claim 1, further comprising:
detecting an input on the child application within the interface;
determining an another child application to perform at least one sub-activity associated with the activity of the parent application;
causing to display an another interface comprising the another child application;
performing the at least one sub-activity by the another child application within the another interface and displaying a result of the at least one performed sub-activity within the another interface; and
synchronizing the result of the at least one performed sub-activity in at least one of the parent application and the child application.

5. The method of claim 1, further comprising:
synchronizing the child application displayed within the interface with at least one of a wearable device or another electronic device.

6. An electronic device for automatically managing activities of an application, comprising:
a memory; and
a processor coupled to the memory, configured:
detect an input on a data item of a parent application displayed on a screen of the electronic device,
determine a child application to perform an activity related to the data item of the parent application,
display an interface comprising the child application on the parent application,
perform the activity related to the data item of the parent application by the child application within the interface,
display a result of the performed activity within the interface, and
synchronize the result of the performed activity by the child application with the parent application,
detect an invert relationship event, and
in response to detecting the invert relationship event, update a relationship between the parent application and the child application by inverting the relationship, wherein inverting the relationship comprises operating the parent application as the child application and the child application as the parent application.

* * * * *